United States Patent [19]

Peterson

[11] Patent Number: 4,999,986
[45] Date of Patent: Mar. 19, 1991

[54] FRUIT DECELERATOR

[75] Inventor: Donald L. Peterson, Martinsburg, W. Va.

[73] Assignee: The United States of America as represented by the Secretary of Agriculture, Washington, D.C.

[21] Appl. No.: 531,680

[22] Filed: Jun. 1, 1990

[51] Int. Cl.$^5$ ............................................. A01D 46/00
[52] U.S. Cl. ..................................... 56/328.1; 56/329
[58] Field of Search .................... 56/340.1, 328.1, 329, 56/1, DIG. 2, DIG. 5

[56] References Cited

U.S. PATENT DOCUMENTS

| 3,474,609 | 10/1969 | Alberti et al. | 56/329 |
| 3,531,925 | 10/1970 | Vines et al. | 56/329 |
| 3,596,455 | 8/1971 | Adrian | 56/340.1 |

OTHER PUBLICATIONS

"A Small, Single Frame Peach and Apple Harvester", Paper No. 77-1526, ASAE, Dec.-1977, McHugh et al.
Transation of the ASAE, 1985, vol. 28, No. 5, pp. 1393-1397, D. L. Peterson et al.
Transactions of the ASAE, 1982, vol. 25, No. 6, pp. 1478-1483, D. L. Peterson.
Journal of Agricultural Engineering Research, 1989, vol. 42, pp. 43-50, D. L. Peterson et al.
Berlage et al., "Performance of a Mechanical Apple Harvester With Sorting Capability", ASAE Summer Meeting-Paper No. 81-1060, 1981, p. 3.

Primary Examiner—Ramon S. Britts
Assistant Examiner—Terry Lee Melius
Attorney, Agent, or Firm—M. Howard Silverstein; John D. Fado

[57] ABSTRACT

A fruit decelerator having a plurality of adjacent resilient rollers able to receive substantial quantities of fruit free-falling a distance of at least four feet without harming the fruit; wherein there are gaps between some of the adjacent rollers; wherein there is a single tier of several side-by-side gaps; wherein the rollers in each gapped pair are counter rotating in the direction of the gap's entrance; wherein the rollers' rotational movement conveys fruit through a fap at a velocity below the impact velocity on the resilient rollers, and places the fruit gently on a conveyor.

5 Claims, 3 Drawing Sheets

FRUIT DECELERATOR

FIELD

The present invention relates to the handling of fruit during harvesting or transferring thereof.

PRIOR ART

It is known in the prior art to decelerate the downward movement of free falling fruit, during harvesting or handling, for the purpose of preventing harm to the fruit as it drops or otherwise moves toward a conveyor. Layers of foam rubber tubing and inclined, padded catching surfaces previously have been employed for this purpose.

SUMMARY

We now have developed an improved deceleration system for free-falling fruit during harvesting by a tree shaker. Broadly, the apparatus comprises a resilient catching surface immediately above the conveyor, that is able to intercept free-falling fruit at speeds equal to a velocity as high as several feet of free-fall without harming the fruit; a plurality of side-by-side parallel channels extending downward from the catching surface toward the conveyor through which individual fruits pass directly to the conveyor; wherein each channel is defined by opposed, resilient walls; wherein each of the walls includes means to propel fruit through a channel at a velocity lower than the impact velocity on the catching surface; wherein the surface includes means to direct or propel fruit to the channels.

An object of the present invention is to prevent damage to fruit as it is loaded onto a receptacle such as a conveyor.

Another object is to decelerate free-falling fruit and gently place it on a conveying system.

A further object is to prevent fruit-on-fruit damage caused by fruit collisions during handling.

A still further object is to decelerate the free-fall of fruit from a mechanical harvester such as a tree fruit shaker as disclosed in U.S. Patent No.4,606,179.

Yet another object is to decelerate the velocity of fruit in handling and transfer situations, such as in packing sheds.

An even further object is to use counter rotating rollers to remove fruit from an area to prevent fruit-on-fruit damage from subsequent falling fruit.

Other objects and advantages will be obvious from the following more detailed description of the invention, in conjunction with the drawings in which.

DETAILED DESCRIPTION

Figure 1:
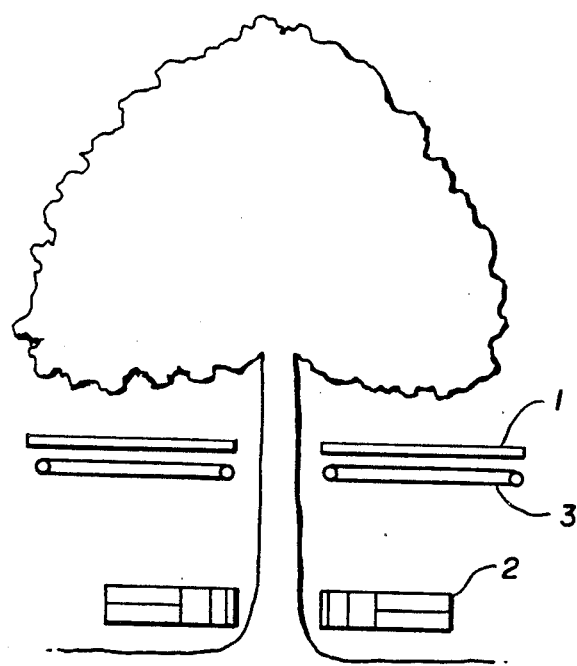
FIG. 1 illustrates, in a partial schematic fashion, the present invention in combination with a tree shaker and conveyor.

Referring to FIG. 1, the device of the present invention generally is represented by reference numeral 1. It is employed in combination with a schematically represented prior art tree shaker 2 and catcher 3 that are well known in the art. Some of these shaker-catcher systems are disclosed in:

Paper No. 77-1526, "A Small, Single Frame Peach and Apple Harvester", by McHugh et al, paper presented at the meeting of the American Society of Agricultural Engineers, Palmer House, Chicago, Ill., Dec. 13-16, 1977, by Clemson University, Agricultural Engineering Department;

U.S. Pat. No. 3,596,455;

Transactions of the ASAE, 1985, v. 28, no. 5, pp 1393-1397, D. L. Peterson et al;

Transactions of the ASAE, 1982, v. 25, no. 6, pp 1478-1483, D. L. Peterson;

Journal of Agricultural Engineering Research, 1989, v. 42, pp 43-50, D. L. Peterson et al.

Figure 2:
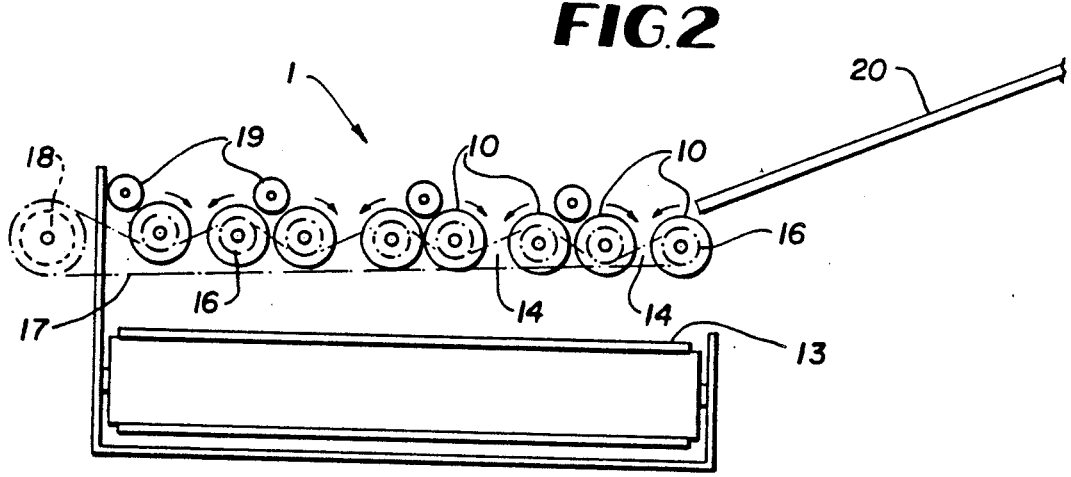
FIG. 2 shows details of the present invention.

Referring to FIG. 2 for details of the device 1 of the present invention, several resiliently surfaced, adjacent rollers 10 are provided across the width of, and immediately above, a conveyor 13. The upper surface of the rollers provides the catching surface of the present invention for the falling fruit. Among some, but not all, of the adjacent rollers 10, there are gaps 14 that provide the single tier of several (three or more) side-by-side channels of the present invention that connect the surface to the conveyor 13. Each gap 14 longitudinally extends along conveyor 13.

The rollers on each side of a gap 14 are counter rotating in the direction of the gap's entrance, and are driven by conventional sprockets 16, chain drive 17, and motor 18. Between the gaps, the catching surface is impervious to the passage of fruit due to the fact that the distance from one gapped roller pair to the next gapped roller pair is too narrow to permit such passage.

Positioned above one or more of the rollers are stationary foam tubes or rollers 19. These tubes decelerate falling fruit and deflect it towards gaps 14.

In addition to directly receiving free-falling fruit, it can be seen that an end pair of gapped rollers may receive fruit rolling down an inclined surface or ramp 20.

The operation of the rollers is such that a free-falling piece of fruit, or a piece of fruit entering the area from an inclined ramp, falls into one of the several side-by-side gaps 14 or is deflected or propelled toward a gap by the rotating rollers 10 or the tubes 19. Thereafter, each piece of fruit is moved through one of the gaps directly to the conveyor, by means of rotating rollers.

Fruit typically falls from heights of about 1-8 feet, whereby the impact velocity on the rotating rollers 10 is about 8-25 ft./second. Thereafter, each individual piece of fruit travels to a gap 14 (if it doesn't fall directly into a gap) to be passed to the conveyor, thereby avoiding fruit-on-fruit damage from other falling fruit. Since most trees will be several feet tall, the unit should be designed to intercept substantial quantities of free-falling fruit, dropping about the same time, for a distance of at least 4 feet (velocity of at least 16 ft./sec), from a tree branch or from another natural or man-made container of fruit other than a tree branch, without harming the fruit. The invention also is suitable for catching or intercepting other kinds of solid objects that are randomly and continuously falling from a container thereof, which objects are susceptible to damage from (a) the fall itself, and (b) object-on-object collisions.

Figure 3:
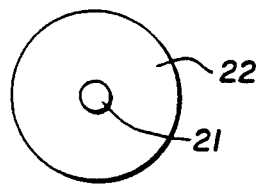
FIG. 3 shows a single roller.

As shown in FIG. 3, each roller comprises an inner rigid shaft 21 and an outer resilient jacket 22. The jacket may be fabricated from polyurethane foam. The jacket dimensions are such that it snuggly fits on shaft 21 so that there is no movement between shaft and jacket. The outside surface of the foam can be covered with a thin protective sheet, e. g., neoprene on nylon, to increase durability of the rollers.

The rollers' resiliency, in combination with the width of the gap 14, is such that the largest diameter fruit passing through the gap does not experience compression damage, and the smallest fruit passing through the gap does not pass therethrough without experiencing interference from the rollers. Since the foam is resilient or compressible, the decelerator can handle a wide range of fruit sizes.

The speed of rotation of the rollers is such that the fruit gently is positioned onto the conveyor.

Parameters of an operating prototype, for fruits such as apples, peaches, or pears, are as follows: jacket, 5" O.D., ¾" I. D., foam density, 0.08 oz/in$^3$; shaft, ⅜" O.D.; gap between rollers, 1.25"; rotational speed, 30 rpm; distance between top of conveyor and bottom of rollers 10, 5"; rollelr length, 4'.

Figure 4:
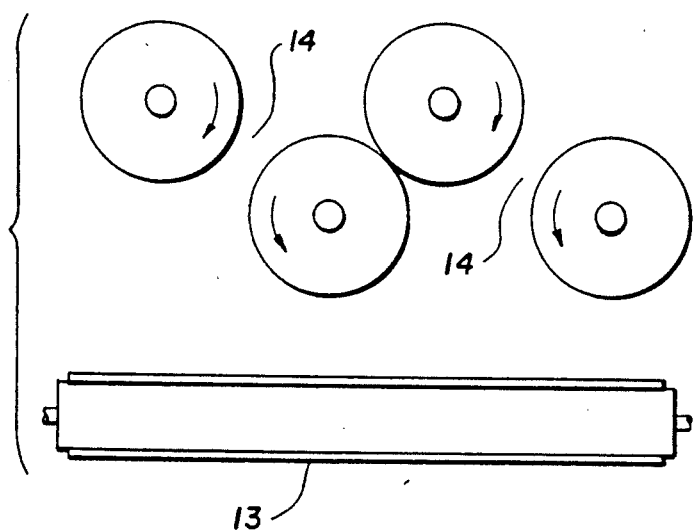
FIG. 4 shows an alternative array of roller pairs.

Referring now to FIG. 4, therein is shown an embodiment wherein adjacent rollers are not all in the same plane because the width of the conveyor is not sufficient to enable positioning of the rollers in the same plane while still providing a sufficient number of side-by-side gaps 14.

Figure 5:
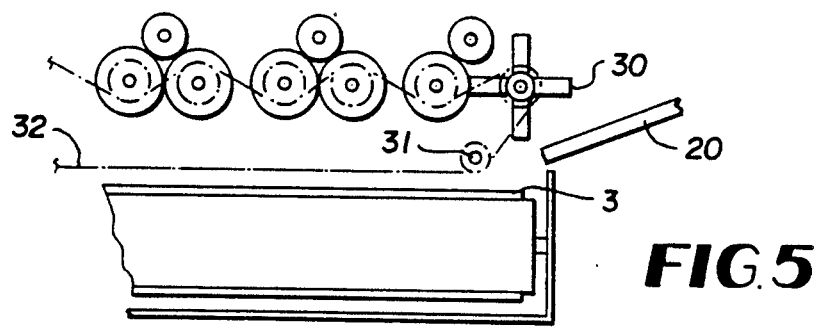
FIG. 5 illustrates an alternative embodiment to receive fruit from an inclined ramp.

Referring now to FIG. 5, therein is shown an alternative embodiment to employing a gapped roller pair to decelerate fruit rolling down an inclined surface. In this embodiment, the declerator comprises a resilient paddle wheel 30. The wheel may be fabricated from a rigid shaft, a foam jacket friction fitted to the shaft, and foam paddles glued or otherwise secured to or integrated with the foam jacket. The wheel is rotated such that the paddles are moving downward towards the lower end of the inclined surface. An idler wheel 31 may be employed for control of movement of the chain drive. Exemplary parameters are as follows: ⅜" shaft; foam jacket, 2" O. D., ⅜" I. D.; foam paddles, 2" wide×2½" deep; rotational speed, 40 rpm.

I claim:

1. In an apparatus for harvesting fruit from fruit trees employing tree shaking means in combination with a resilient catching surface and conveyor for receiving free-falling fruit, the improvement comprising a plurality of side-by-side channels extending downward from said catching surface toward said conveyor through which individual fruits pass directly to said conveyor; wherein each channel is defined by opposed, resilient walls; wherein each of said walls includes means to propel fruit through a channel at a velocity lower than the impact velocity on said catching surface; wherein said catching surface includes means to direct fruit to said channels; wherein there is a single tier of side-by-side channels; wherein said catching surface comprises several adjacent resilient rollers; wherein said channels are defined by gaps between adjacent rollers among said resilient rollers; means to counter rotate rollers in each roller pair having a gap therebetween so that a roller rotates in the direction of its respective gap entrance; wherein said catching surface between said gaps is impervious to the passage of fruit to said conveyor; and wherein said means to direct fruit from said catching surface to said gaps includes stationary, resilient rollers immediately above said rotated rollers.

2. The apparatus of claim 1 further including an inclined surface adjacent at least one end of said catching surface to catch fruit that is not free-falling directly toward said catching surface, and to direct fruit on said inclined surface toward said catching surface.

3. The apparatus of claim 1 further including a resilient paddle wheel positioned adjacent the bottom of said inclined surface to intercept fruit reaching the bottom of said inclined surface, and to direct said intercepted fruit to said catching surface.

4. Means to catch solid objects that are falling continuously and randomly from a container, wherein said objects are susceptible to damage from (a) the fall itself, and (b) object-on-object collisions at the end of the fall, comprising
   a. a resilient catching surface sufficiently spaced from said container so that substantial quantities of said objects randomly impact on said surface at velocities equivalent to at least four feet of free fall;
   b. several side-by-side channels extending downward from said surface through which individual objects may pass; wherein each channel is defined by opposed, resilient walls; wherein each of said walls includes means to propel an object through a channel at a velocity lower than the impact velocity on said surface; wherein said surface includes means to direct objects to said channels to avoid object-on-object collisions from other falling objects;
   wherein said surface comprises a plurality of adjacent resilient rollers; wherein said channels are defined by gaps between adjacent rollers among said resilient rollers; means to counter rotate rollers in each roller pair having a gap therebetween so that a roller rotates in the direction of its respective gap entrance; wherein said catching surface between said gaps is impervious to the passage of said objects; and
   wherein said means to direct objects from said catching surface to said gaps includes stationary, resilient rollers immediately above said surface.

5. In an apparatus for harvesting fruit from fruit trees employing tree shaking means in combination with a resilient catching surface and conveyor for receiving free-falling fruit, the improvement wherein said catching surface comprises
   (a) several adjacent pairs of resilient rollers, each pair having a gap between its rollers extending downward from said catching surface toward said conveyor;
      (i) wherein the width of each gap, and the resiliency of said rollers is such that fruit passing through a gap experiences interference from said rollers;
      (ii) wherein said gaps are side-by-side;
      (iii) wherein there is a single tier of side-by-side gaps leading directly to said conveyor;
      (iv) wherein the distance between adjacent roller pairs is too narrow to permit passage of fruit therebetween; and
   (b) means to counter rotate rollers in each gapped pair in the direction of each gap's entrance at a speed to propel fruit through a gap at a velocity lower than the impact velocity on said catching surface.

* * * * *